Aug. 9, 1960       W. E. OSBORNE                2,948,813
                   TRACKING SYSTEM

Filed Aug. 21, 1950                          5 Sheets-Sheet 1

INVENTOR.
William E. Osborne
BY
D. Gordon Angus
ATTORNEY

Aug. 9, 1960 W. E. OSBORNE 2,948,813
TRACKING SYSTEM
Filed Aug. 21, 1950 5 Sheets-Sheet 2

INVENTOR.
William E. Osborne
BY
D. Gordon Angus
ATTORNEY

United States Patent Office 2,948,813
Patented Aug. 9, 1960

2,948,813

TRACKING SYSTEM

William E. Osborne, North Hollywood, Calif., assignor, by mesne assignments, to Aerojet-General Corporation, Cincinnati, Ohio, a corporation of Ohio Filed Aug. 21, 1950, Ser. No. 180,610

8 Claims. (Cl. 250—203)

This invention relates to target or object detecting systems and has for its principal object to provide accurate means for pointing to or sighting on a target or object.

Homing devices are known for causing propelled missiles and the like, such as rockets, to steer a course toward a target. A typical example is a guided missile driven by jet propulsion such as a rocket motor carrying a war head. Such missiles are aimed at targets such as enemy aircraft which may be moving at a rapid speed; and it is desired to steer the missile automatically to the target regardless of the direction or speed or course of the target. The steering is done in response to a pointing or sighting system which shows the direction of the target from the missile.

In accordance with my invention, I provide a pointing or sighting system of this character which operates from radiant energy emanating from the target. It is known that many bodies such as the hot engine of an aircraft give off radiation, particularly infra red energy, which can be detected at a considerable distance by suitable detecting means sensitive to it. In accordance with my invention, I focus the radiant energy from the target upon a rotating mirror or optical device which directs it to a spot in proximity to a cell sensitive to the radiant energy such as a lead sulphide cell. The optical device is placed on a gyroscope which is mounted on a universal bearing so that its axis of rotation may be shifted in any angular direction. The mirror reflects at an angle relative to the axis of rotation of the gyro so that when the axis of the gyro points to the target, or object, the spot of radiant energy travels in a path around the sensitive cell without energizing it.

If, during the flight or travel of the missile or vehicle toward the target, the gyro axis should not point to the target, for any reason, a resulting change of direction of incident rays received at the optical device from the target will result in a change of position of the spot of energy at the cell, so that the path of travel of the spot will cross the sensitive area of the cell and energize it.

In accordance with a feature of my invention, I use the resulting response of the cell to the radiant energy spot during times when the gyro is not on the target, to precess the gyro so that the tilted optical device mounted on the gyro will be moved in the amount and direction to cause the path of the energy spot again to travel around the cell without crossing it, thereby producing a cessation of the signal output of the cell, and thus ending further precession of the gyro so long as the gyro remains on target.

A related feature is the provision of means whereby the precessing of the gyro is in the direction corresponding to the direction by which the gyro is off-target.

According to a preferred feature, the precessing of the gyro is produced by means of a "precession" coil which receives pulses of electrical energy corresponding to the pulses of response of the sensitive cell. This feature can be carried out according to a preferred feature by provision of an annular ring type permanent magnet having permanent north and south poles at spaced positions around the ring. Whenever a pulse of electric current passes through the precession coil there is a corresponding repulsion or attraction of the coil in relation to the poles of the magnet, producing a resultant turning moment on the magnet which precesses the gyro. The direction of the precession will depend on the angular position of the poles of the magnet on the rotating gyro at the time when the pulse occurs, which in turn depends on the position of the path of the energy spot crossing the sensitive cell. Since the position of the annular path depends on the direction by which the gyro is off-target, it follows that the direction of precession is likewise dependent on the off-target direction; and the direction of precession is made to correct for the off-target condition and thus bring the gyro back on target.

In accordance with common practice, the missile or vessel will be provided with adjustable guiding vanes for steering it both in lateral and vertical directions, and these guiding vanes may be operated by a suitable servo system, of which types are well known.

According to a feature of this invention, such servo system or other system used to operate the steering vanes is operated from the relative positions of the missile and gyro axes.

The present invention is not necessarily limited to aircraft but may be used also with other vessels such as craft movable in water or on land; and the term "vessel" as used herein covers all such craft or vehicles. Furthermore, the invention is not necessarily limited to the guiding of a vessel toward a target or object but could, if desired, be used to guide a vessel away from or in a different direction from an object.

Other features and advantages of this invention will become apparent from the following detailed description and the accompanying drawings, of which.

Figure 1:
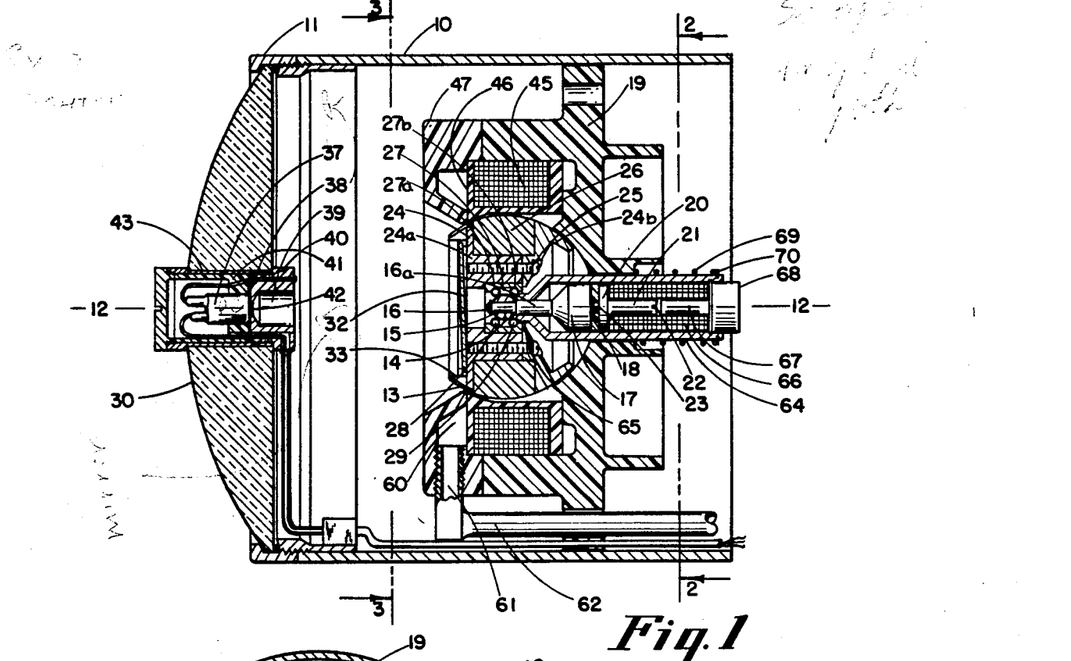
Fig. 1 shows a side elevation view, partially in cross-section, of a homing device according to my invention.
Figure 2:
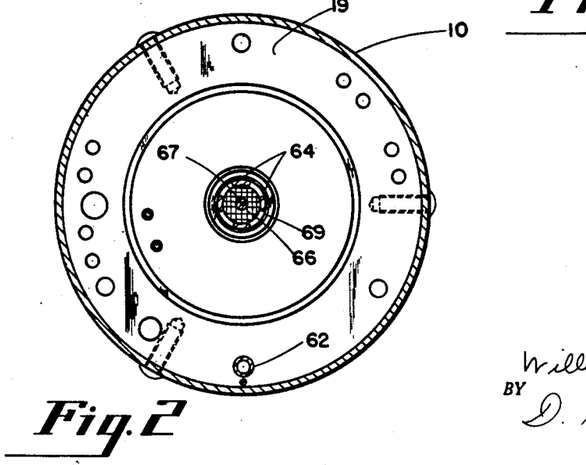
Fig. 2 is a view of the impeller, looking from line 2—2 of Fig. 1, used to turn the gyro.

Referring to the drawings, Fig. 1 shows a homing device or seeker according to this invention. The device comprises a hollow housing, or mounting 10 having a front end ring or mouth 11; and the device is adapted to be attached (by means not shown) to the missile or vessel whose direction of travel is to be controlled, the position of attachment being such that the longitudinal axis 12—12 of the seeker is in the same direction as the longitudinal axis of the travel of the missile.

Just back of the mouth 11 there is located a rotatable gyro, or gyro rotor, 13 mounted on a ball 14 held on an axle pin 15 which passes through a diameter of the ball; a screw and washer 16 serving to hold the ball against the shoulder of an enlarged section 16a of the pin. The term "gyro" as used herein, signifies the gyro rotor. The rear end of pin section 16a enlarges to a greater diameter 17, the rear face of which abuts against the wall 18 of a rigid material which is preferably a non-magnetic material; the wall 18 being part of, and preferably integral with a disc-like mounting member 19 of the same material, which is suitably fastened to the inner wall 10 of the housing. The member 17 is fastened to wall 18 by the provision of a circular disc 20 held on the opposite side of wall 18 from member 17 by a stud 21 provided with a screw driver slot 22 having a shoulder which abuts member 20 and having a threaded screw portion which extends through a hole 23 through the two portions 24a and 24b held together by screws 25. The gyro member 24 has formed around its periphery an annular slot of the proper shape and size to receive an annular ring magnet 26 which may be of a suitable magnetic material such as an alloy of nickel, iron and aluminum sold under the trade name of "Alnico 5." The gyro rotor is mounted on the ball 14 in such a manner that the gyro is free to turn in any direction on the ball within the limits of movement permitted by the construction. For this purpose there is provided on the inner periphery of the gyro member 24, a cylindrical ball race 27 having rounded annular walls 27a and 27b, spaced at the proper distance from the universal ball 14 to hold a series of smaller balls 28 and 29, thus providing a ball bearing universal arrangement for the gyro.

Figure 3:
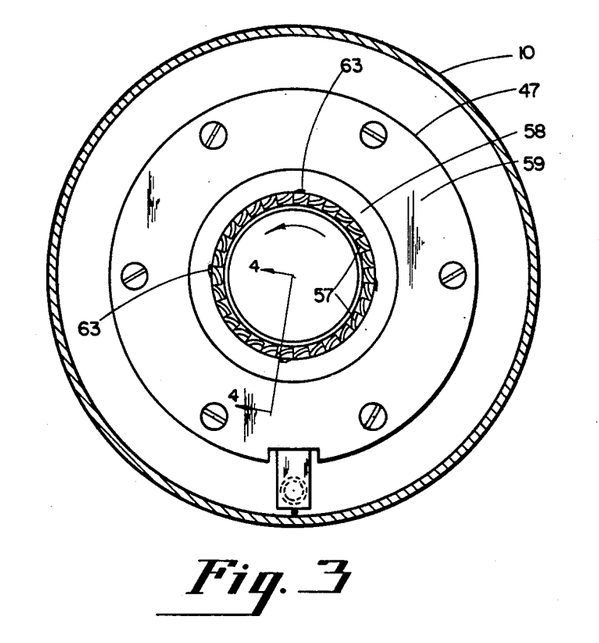
Fig. 3 is a cross-section view taken at line 3—3 of Fig. 2, showing a detail.
Figure 4:
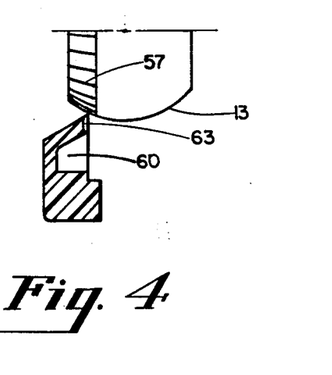
Fig. 4 shows a detail of an arrangement shown in Fig. 3.

For the purpose of rotating the gyro, there is provided an air-driven impeller as shown in Fig. 3, which is a view looking into the front of the gyro, taken at line 3—3 of Fig. 1. This comprises vanes 57 formed around the periphery of the gyro just inside the conical portion 58 of member 47. This conical portion 58 forms with the front wall 59 an annular passageway 60 (Fig. 1) into which compressed air is injected through an outlet 61 from a conduit 62 leading from a suitable source of compressed air (not shown). Around the periphery of annular passageway 60 there are located several pipes or conduits 63 which lead from the space 60 through the conical portion 58 in a slanting direction toward the impeller blades 57, as indicated in Fig. 4, which is a detail view partially in section taken at line 4—4 of Fig. 3. The compressed air blows through these pipes 63, impinging on the blades, thereby rotating the gyro at high speed on its ball bearing. A suitable speed of rotation would be in the order of about 20,000 rotations per minute.

Within the mouth 11 there is located a lens 30 facing the target while the missile is travelling, the target ordinarily being a moving craft or vessel such as an airplane or the like which may be some miles away. Such a target emits infra red radiations in all directions, particularly from its hot engine, and those particular rays 31 which go to the seeker are incident on the lens 30 (see Figs. 5 and 6) which directs them to a mirror 32 mounted within the front opening 33 of the gyro. Since the lens 30 is convex, the parallel incident rays 31 will be refracted and converged toward each other along lines 31a to the mirror 32 which will reflect them along lines 31b and bring them to a focus on a relatively small spot 34. The face of the mirror is mounted at an angle relative to the plane which is normal to the axis of rotation of the gyro; that is, there is an angle $\theta$ between the plane 35 normal to the gyro axis of rotation and the plane 36 of the face of the mirror. For the present purpose, the angle $\theta$ may conveniently be about 1°.

There is axially mounted within lens 30, a cell 37 which is sensitive to the infra red radiation. This cell assembly is fixed in place in a central hole through the lens 30 through which there is inserted a sleeve 43 into which are fitted bushing members 40 and 41; and the sensitive surface 38 of the cell is directed rearwardly and left uncovered by reason of the opening 39 of bushing member 40 which supports the cell 37 in cooperation with a bushing member 41. To expose the sensitive surface, the opening 39 is narrowed down to a relatively small opening 42. The angle $\theta$ of the mirror is such that the spot of light 34 is located beside the sensitive surface 38 but does not coincide with it when the axis of the gyro is directed on the target.

Figure 5:
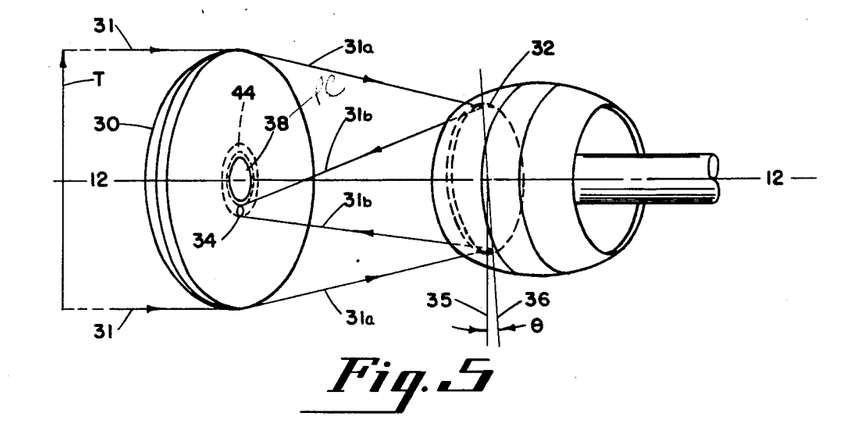
Fig. 5 is a perspective diagram showing the focusing of the received radiant energy in the device of Fig. 1, this diagram showing the on-target condition.

The relation of the spot 34 to the sensitive surface 38 is shown in Fig. 5 wherein the annular path 44 is shown in dotted lines concentrically around the sensitive surface 38. Thus, as the gyro rotates, the spot 34 from the eccentric mirror describes the annular path 44, and it does not cross the sensitive surface. This is the on-target condition of the gyro.

Figure 6:
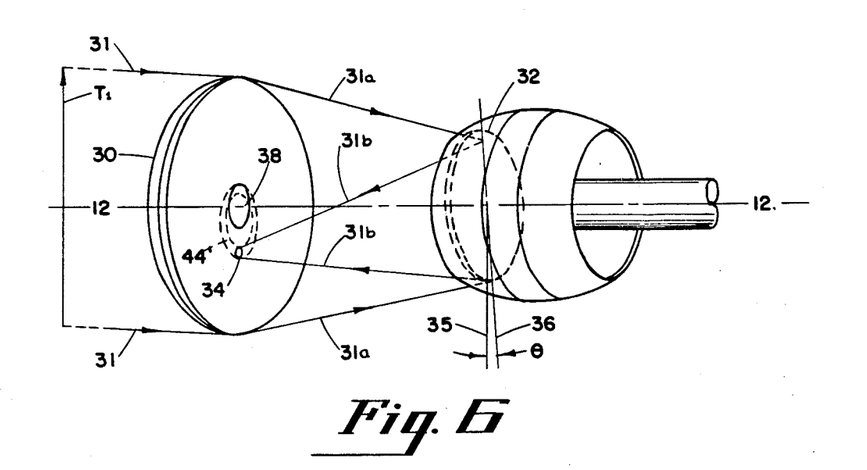
Fig. 6 is a perspective diagram similar to Fig. 3 showing the relationships for an off-target condition.

The off-target condition of the gyro is shown in Fig. 6 wherein the target T is shown displaced from its original position to a new position $T_1$. This produces a relative change of direction of the rays, and results in a corresponding displacement of the annular path 44 to a new position 44'. Under this circumstance, the path 44' crosses the light sensitive element so that with each revolution of the gyro, the element is sensitized.

The direction of displacement of the annular path 44 from its on-target position, is, moreover, dependent on the direction of the displacement of the target T from the on-target condition. In Fig. 6 the target T is assumed to have moved directly upward so that the annular path 44 has moved directly downward to its position 44'. Conversely, if the target T had moved directly downward, then the path 44 would have moved directly upward. Similarly, if the target had moved laterally to one side or the other, the path 44 would correspondingly have moved laterally to the opposite side. If the target T should move both laterally and vertically corresponding amounts of opposite movement of the path 44 would occur.

Figure 7:
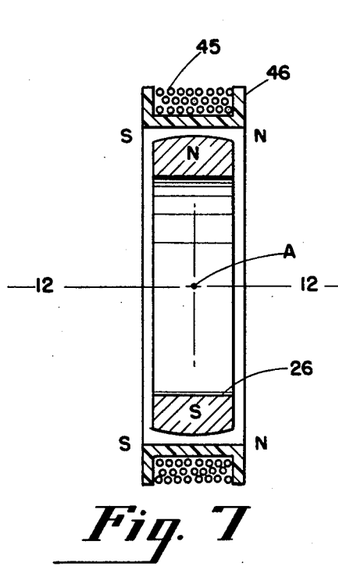
Fig. 7 shows diagrammatically the relation of the precession coil in Fig. 1 to the poles of the annular magnet on the gyro.
Figure 8:
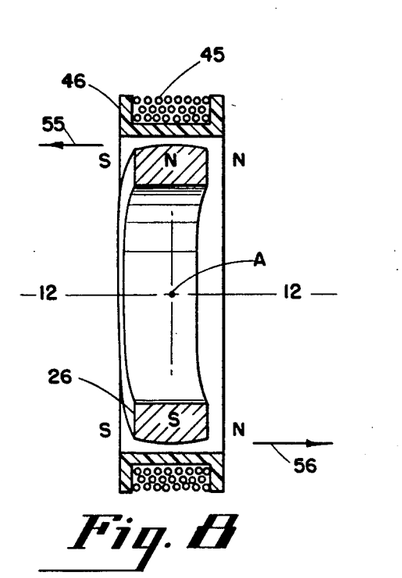
Fig. 8 shows diagrammatically the manner of precession of the gyro.
Figure 9:
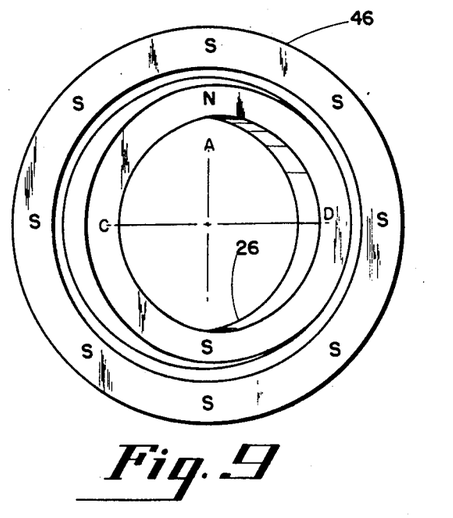
Fig. 9 is a face view of the arrangement shown in Figs. 7 and 8.

When the gyro is in an off-target condition as shown in Fig. 6 it is desired to bring it back to the on-target position of Fig. 5. This is done by precessing the gyro in response to signals from the sensitive cell when the spot 34 crosses it. For precessing the gyro there is mounted a precession coil 45 on an annular coil support 46 of a non-magnetic material, fastened inside the housing by a suitable coil holding member 47 which is suitably fastened to member 19; and this coil is positioned to be in magnetic relation to the annular magnet 26 on the gyro. For this purpose, the precession coil 45 is placed concentrically around the magnet 26. The annular magnet 26 is of the type having diametrically opposite located north and south poles as shown in Figs. 7, 8 and 9.

Figure 10:
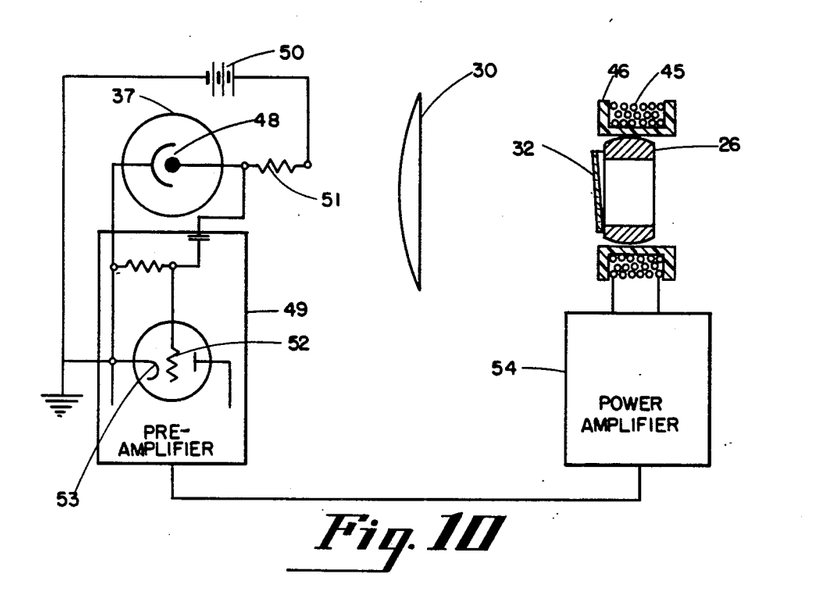
Fig. 10 is a schematic block diagram showing an electrical system for precessing the gyro.

For the purpose of energizing the precession coil 45 in response to the spot of energy 34 crossing the cell surface 38, the response of the sensitive cell is applied to the coil, preferably through a suitable amplifier. Fig 10 shows in block diagram form an electric circuit for doing this. The cell 37 is preferably of the well-known lead sulphide type which is especially sensitive to infra red radiation, although it should be understood that some other type of cell sensitive to the radiation could be used instead, if desired. Furthermore, it may be possible to utilize other forms of radiation than the infra-red; and it may be either visible or invisible. The type of sensitive cell will be selected to suit the kind of radiation.

The characteristic of the lead sulphide type of cell is that its resistance undergoes a marked decrease when subjected to the spot of infra red radiation. In the arrangement of Fig. 10, the resistance 48 of the cell is connected across the input of a preamplifier 49 in series with a direct voltage source 50 and another resistor 51. Since a characteristic of a lead sulphide type of cell and other similar cells is that their resistance decreases with the radiation impinged upon them, the resistance 48 will decrease markedly each time the spot 34 crosses the cell. The resistance 48 is connected across the input of the amplifier 49, for example, by applying it across the grid 52 and cathode 53 of the initial tube of the amplifier. The remaining tubes of the amplifier are not shown as their connections are well understood in the art. The output of the pre-amplifier will ordinarily be carried to a power amplifier 54, the output of which is connected to the precession coil 45 as shown. A suitable arrangement for the pre-amplifier is that described in the Radio Engineering Handbook, by Henney, 3rd edition, 1941, at p. 366, par. 10; and a suitable form of power amplifier is that described in the same text at page 386, paragraph 22.

Figure 11:
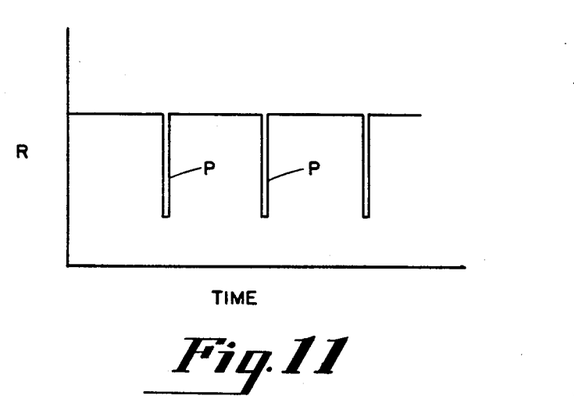
Fig. 11 is a graph showing the change of resistance in the sensitive cell of Fig. 1.

The change of resistance of the cell 37 is shown in Fig. 11. This shows the pulses of lowered resistance of short duration at regular timed intervals corresponding to each passage of spot 34 across the cell. Since current is flowing through the resistance 48 due to the battery 50 these pulses will produce a corresponding decrease of voltage across the resistance which will be applied at the input of the preamplifier and thus be amplified and carried to the coil 45, thereby precessing the rotating gyro.

The way in which this precession works is shown in Figs. 7 and 8, in which the direction of the current flow through the coil during a pulse is assumed to be such as to produce a north pole N on the right-hand face of the coil support 46, and a south pole S on the left-hand face. Since like poles repel and unlike poles attract it will be apparent that every time there is a pulse of current through the fixed precession coil, there will be a reaction with the north and south poles of the permanent magnet 26, and these forces exist in the directions shown by the arrows; the sum of these forces is represented by the arrows 55 and 56 which create a turning couple at the north and south poles of magnet 26. In accordance with the known characteristic of gyros this produces a turning movement at 90° from these forces, so that the gyro actually turns or precesses about an axis A, the point C moving up from the plane of the drawing (Fig. 9), while the point D moves down with respect to the plane of the drawing. Figs. 8 and 9 illustrate the position of magnet 26 after this precession. The amount of this angular precession will depend upon the number of pulses and the magnitude of each pulse because for each pulse at the sensitive cell there will be a corresponding amount of angular precession. Accordingly, the precession will continue until the axis of the gyro gets back on target again.

It will be recognized that the diagonally opposite north and south poles of annular magnet 26 may lie in any angular position throughout the 360 degrees of rotation of the gyro at the time that a pulse is received at the precession coil. The particular angular position of these magnet poles when the pulse is received will depend on the particular time during a revolution of the gyro when the spot 34 crosses the sensitive cell. This in turn will depend on the direction by which the gyro axis is off-target, as can be seen from Figs. 5 and 6. For example, when the target $T_1$ is directly vertical with respect to the on-target condition, the spot 34 crosses the sensitive cell at the top of its annular orbit; and when the target T is vertically downward with respect to the on-target position, the spot will cross the cell at the bottom of its orbit, that is just 180 degrees away. For other relative angular displacements of the target from the axis of the gyro there will be corresponding times during a revolution of the gyro at which the spot 34 will produce the pulse. Consequently, at each pulse the axis of rotation of the gyro will be moved toward the on-target position until it gets back on target.

For protection against damage to the mechanism, it is desired that it be possible to lock the gyro in a neutral position so that the gyro will not precess until a predetermined time. For example, it may be desired to set the mechanism so that precession of the gyro cannot occur until the missile has been sent on its way toward the target. This can be done by a locking arrangement attached to the universal ball joint. This comprises a sleeve 64 coaxial with the normal or neutral axis of the gyro 12–12 (Fig. 1). At its forward end, the sleeve is narrowed down to a neck 65 which fits slidably over the pin member 16a, so that when the sleeve is urged forwardly the open end of the neck will abut against the rear seat of the balls 29 in such a manner as to make the axis of rotation of the gyro collinear with axis 12—12 of the missile. To urge the sleeve forwardly in this manner, there is provided a solenoid 66 within the sleeve and the core of the solenoid is formed by magnetic member 21 and an additional magnetic core member 67 in the form of a rod which abuts against the outer end of member 21. The outer or rear end of core member 67 terminates in a knob or mass of magnetic material 68 which is attached to the sleeve 64. When electric current is sent through the solenoid, the magnetic field draws in the members 67 and 68 to slide the sleeve toward the front so as to lock against the balls in the manner described. When the solenoid is de-energized, the sleeve moves rearwardly under action of a compression spring 69 compressed between fixed member 19 and a stop or ring 70 on the sleeve. Arrangements can be made to send the energizing current through the solenoid by automatic or delayed switch means or the like after the missile or vessel is under way, so as to release the gyro and allow it to precess.

The gyro precession can be used to operate steering mechanism in response thereto, and any suitable system can be used to control the steering equipment of the missile or vessel in response to the gyro precession. The gyro, in effect, acts as a pointer; that is, by reason of the precession operation the axis of rotation of the gyro always tends to point toward the target or object from which the radiation emanates. Any desired use can be made of this pointing action. For example, the pointing action could be used to steer the aircraft or vessel in correspondence. For example, a simple steering system responsive to this automatic pointer could be a control of the steering and elevation control devices. In this respect, the axis of the gyro may be considered as a form of airplane joy stick. Since means of controlling an aircraft by a joy stick are well known, they need not be given here, as the steering system responsive to the deflection of the axis is no part of the present invention.

A system which has been found especially useful for guiding a missile or aircraft in response to precession of the gyro involves the use of a pair of electrical elements such as inductances or capacities whose values are varied in accordance with the gyro procession. For example, coils or condenser plates may be mounted in a fixed position near the metallic periphery of the gyro and spaced 90° apart. These inductive or capacitive elements can be connected in a frequency determining or responsive system, for example, a frequency discriminator or the like and since the elements are spaced at angular positions around the gyro, an electrical response will be obtained in dependence on the off-target condition of the seeker; and this response can be made to steer the vessel back on target. A suitable such system for this purpose is illustrated and described in the co-pending application Serial No. 187,613, filed September 29, 1950, now Patent #2,866,146, December 23, 1958 entitled Steering System, in the name of Charles F. Rodriguez, Jr., and assigned to the same assignee as the present application.

It should be noted that when the seeker is mounted on a vehicle such as an aircraft or missile or the like, so that the tracking gyro is being used to point to a target which may be moving relative to the craft, the gyro will remain pointed at the target regardless of variations in direction of the aircraft or missile on which it is mounted (so long as the target does not move away) but if the line of sight between the vessel or missile and the target rotates, the gyro may then become off target; so that it will have to move on target again by operation of the system.

It should be understood that it is not necessary for the gyro to be lined up with the line of travel of the missile or aircraft in order to have the neutral condition of the annular path of the energy spot crossing the sensitive cell. The neutral condition will occur whenever the axis of the gyro is on target, and this will be true even though the axis of the missile should be still off target.

It will be recognized that by my invention, I have provided an automatic pointing system for sighting on an object or target in a manner useful for controlling the axis of travel of a vessel or aircraft. Use can be made of this pointing system in any desired manner. Steering controls can be attached to the pointer to steer in any desired direction relative to the direction of the pointer. In the most usual case, the steering controls will be adjusted to steer in the direction of the pointer; but it should be understood that the steering controls could be set to steer in some other direction relative to the direction of the pointing, if desired. Thus, the pointer can be used either to steer toward an object or to steer away from it. When the device is to be used for the destruction of the object, such as an enemy vessel or aircraft, or missile, the steering will be in a direction for producing collision on interception; but where the device is to be used as a safety device, it will be desired to steer away from the object.

It should be understood that the term "vessel" or "missile" or "vehicle" as used herein, covers any moving or travelling device which is capable of being steered by a steering mechanism responsive to the pointing of the seeker.

The term "optical radiation" as used herein means radiation or radiant energy, either visible or invisible, which can be handled by optical equipment.

The terms "target" or "object" mean anything which gives off the optical radiation which can be detected by the seeker.

It should be understood that the pointing system according to the present invention need not necessarily be placed on a vehicle, vessel or missile and used in the manner described in the particular example in this specification. It could be placed in any place, either fixed or movable, to point to an object giving off the radiation. Any desired use may be made of this pointing information.

It will be recognized that many variations within the scope of this invention may suggest themselves to those skilled in the art and the invention should not be limited except in accordance with the scope of the appended claims.

I claim:

1. A seeker for sighting on an object which is remote from the seeker and gives off optical radiant energy comprising: a mounting, a gyro rotor, a universal bearing on which the rotor is mounted on the mounting so that the axis of rotation of the rotor can be precessed, a reflecting mirror mounted on and rotatable with the rotor, means for directing some of the radiant energy from the objejct to the mirror for reflection from the rotating mirror, a cell fixed relative to the mounting and in proximity to and responsive to the reflection from the mirror, the reflecting surface of the mirror being eccentric with respect to the axis of rotation of the rotor, whereby the reflection describes a path which does not move across the cell when the axis of rotation of the rotor is sighting on the object, and which moves across the cell when said axis is not sighting on the object, and means responsive to the cell, when the reflection moves across the cell, for precessing the rotor, whereby when the axis of rotation is directed away from the object the radiant energy reflected from the mirror moves across the cell during each revolution of the rotor to produce precession of the rotor in the direction which moves the axis of rotation toward the object.

2. A seeker according to claim 1 in which the means for directing the radiant energy to the mirror comprises a lens which brings the reflection from the mirror substantially to a focus in the vicinity of the cell.

3. A seeker according to claim 1 in which the said path is annular.

4. A seeker for pointing toward a target which is remote from the seeker and emits optical radiant energy, comprising: a mounting, a gyro rotor, a universal bearing held on the mounting, the rotor being rotatable on the bearing, optical means mounted on the rotor and exposed to the radiant energy for bringing some of the radiant energy to a focus, a cell held on the mounting and located in proximity to the focus and responsive to the radiant energy, said optical means being non-coaxial with respect to the axis of rotation of the rotor, whereby the focus describes a path which does not cross the cell when the axis of rotation of the rotor points toward the target, and which crosses the cell when the axis of rotation does not point toward the target, and means responsive to the cell, when the focus crosses the cell, for precessing the rotor, whereby when the axis of rotation is directed away from the target, the radiant energy from the optical means crosses the cell during each revolution of the rotor to produce precession of the rotor in the direction which moves the axis of the rotor toward the target.

5. Apparatus according to claim 4 in which the rotor has attached to it an air impeller, and a supply of air under pressure for driving the impeller to rotate the rotor.

6. Apparatus according to claim 4 in which the means responsive to the cell comprises a magnet on the rotor and a precession coil related to the magnet and means impressing electrical energy on the coil in response to the cell.

7. A seeker for directing the axis of travel of a vessel toward a target which gives off optical radiation, comprising: a mounting, a gyro rotor, a universal bearing fixed relative to the mounting, and on which the rotor is mounted so that the axis of rotation of the rotor can be precessed relative to the axis of travel of the vessel, a reflecting mirror fixed on the gyro rotor and adapted to reflect a beam from the radiation, means for directing the optical radiation to the mirror for reflection of a beam therefrom, a cell fixed relative to the mounting and responsive to the reflected beam from the mirror and located in proximity to the reflected beam, the reflecting surface of the mirror being non-collinear with the axis of rotation of the rotor, whereby the reflected beam describes a path which does not cross the cell when the axis of rotation of the rotor points to the target, and which crosses the cell when the axis of rotation does not point to the target, and means responsive to the cell, when the reflected beam crosses the cell, for precessing the rotor, whereby when the axis of rotation is directed away from the target, the beam reflected from the mirror crosses the cell during each revolution of the rotor to produce the precession of the rotor in the direction which brings the axis of the rotor toward the target, an annular magnet on the rotor having oppositely located north and south poles, and a precession coil fixed relative to the mounting and in magnetic relation to the magnet, the precession coil having opposite poles at the oposite side faces of the coil, said last-mentioned poles extending all around the respective side faces.

8. Apparatus according to claim 7 in which the north and south poles on the magnet are spaced 180° apart.

References Cited in the file of this patent

UNITED STATES PATENTS

| | | |
|---|---|---|
| 1,388,932 | Centervall | Aug. 20, 1921 |
| 2,421,085 | Rylsky | May 27, 1947 |
| 2,439,294 | Hammond | Apr. 6, 1948 |
| 2,451,917 | Chilowsky | Oct. 19, 1948 |
| 2,512,598 | Barkalow | June 27, 1950 |
| 2,534,824 | Jones | Dec. 19, 1950 |

Notice of Adverse Decision in Interference

In Interference No. 92,172, involving Patent No. 2,948,813, W. E. Osborne, TRACKING SYSTEM, final judgment adverse to the patentee was rendered May 20, 1976, as to claims 4, 5 and 6.

[*Official Gazette November 30, 1976.*]